(12) United States Patent (10) Patent No.: US 8,700,872 B2
Takemura (45) Date of Patent: Apr. 15, 2014

(54) INFORMATION PROCESSING SYSTEM, READER/WRITER, INFORMATION PROCESSING APPARATUS, ACCESS CONTROL MANAGEMENT METHOD AND PROGRAM

(75) Inventor: Toshiharu Takemura, Tokyo (JP)

(73) Assignee: Sony Corporation, Tokyo (JP)

( * ) Notice: Subject to any disclaimer, the term of this patent is extended or adjusted under 35 U.S.C. 154(b) by 1004 days.

(21) Appl. No.: 12/145,123

(22) Filed: Jun. 24, 2008

(65) Prior Publication Data

US 2009/0006783 A1 Jan. 1, 2009

(30) Foreign Application Priority Data

Jun. 28, 2007 (JP) ................................ P2007-171072

(51) Int. Cl.
*G06F 13/00* (2006.01)
(52) U.S. Cl.
USPC .......................................... 711/164; 711/103
(58) Field of Classification Search
USPC .......... 711/163, 164, 103, 134; 713/171, 172;
340/5.6, 5.61, 5.4–5.42; 726/20
See application file for complete search history.

(56) References Cited

U.S. PATENT DOCUMENTS

| | | | | |
|---|---|---|---|---|
| 5,491,827 | A * | 2/1996 | Holtey | 711/163 |
| 2001/0029579 | A1 * | 10/2001 | Kusakabe et al. | 713/172 |
| 2004/0110533 | A1 * | 6/2004 | Yamagata et al. | 455/558 |
| 2007/0152068 | A1 * | 7/2007 | Kurita | 235/492 |
| 2009/0236416 | A1 * | 9/2009 | Morita | 235/380 |

FOREIGN PATENT DOCUMENTS

| | | |
|---|---|---|
| JP | 11-015931 | 1/1999 |
| JP | 2002-117378 | 4/2002 |
| JP | 2003-203212 | 7/2003 |
| JP | 2006-121726 | 5/2006 |
| WO | WO-2007/012738 A1 | 2/2007 |

* cited by examiner

*Primary Examiner* — Jared Rutz
(74) *Attorney, Agent, or Firm* — Finnegan, Henderson, Farabow, Garrett & Dunner, L.L.P.

(57) ABSTRACT

There is provided an information processing system having a reader/writer and an information processing apparatus. The reader/writer include a processing section for executing service processing, a processing completion determining section for determining completion of the processing, a control information generating section for generating control information, depending on the determination result and a control information transmitting section for transmitting the control information, and the information processing apparatus includes an internal memory having an access control area, an in-chip communication section for receiving the control information, an internal memory managing section for storing the received control information in the internal memory, a control information obtaining section for obtaining the control information from the internal memory and an access control managing section for setting the access control for the access control area based on the control information.

9 Claims, 9 Drawing Sheets

INFORMATION PROCESSING SYSTEM, READER/WRITER, INFORMATION PROCESSING APPARATUS, ACCESS CONTROL MANAGEMENT METHOD AND PROGRAM

CROSS REFERENCES TO RELATED APPLICATIONS

The present invention contains subject matter related to Japanese Patent Application JP 2007-171072 filed in the Japan Patent Office on Jun. 28, 2007, the entire contents of which being incorporated herein by reference.

BACKGROUND OF THE INVENTION

1. Field of the Invention

The present invention relates to an information processing system, a reader/writer, an information processing apparatus, an access control managing method and a program.

2. Description of the Related Art

Information processing apparatuses capable of communicating in non-contact with a reader/writer such as non-contact type IC (Integrated Circuit) cards (hereinafter called by their generally used name "smart cards") and portable phones being equipped with a non-contact IC chip have become popular lately.

The information processing apparatuses capable of communicating in non-contact with the reader/writer as described above can safely transmit/receive or update data such as electronic money that might otherwise have a problem that the data may be falsified for example by including an IC chip having a tampering resistance. Accordingly, various services utilizing the information processing apparatuses being equipped with an IC chip that is capable of non-contact communication with a reader/writer as described above are widely provided in the society. Then, along with the spread of the provision of such services, the spread of information processing apparatuses such as the portable phone being equipped with the non-contact IC chip is advancing more.

The information processing apparatus allows an user of the information processing apparatus to use the electronic money and others stored within the IC chip when the user inputs a number (so-called password) called as PIN (Personal Identification Number) for example. Accordingly, the information processing apparatus prevents the data such as electronic money from being illegally used by a third party other than the user of the information processing apparatus by making access control by using the PIN.

In the circumstances as described above, various technologies for preventing illegal use of data such as the electronic money have developed in terms of information processing apparatuses. Japanese Patent Application Laid-open No. 2002-117378 for example has disclosed a technology that requires no user input of the PIN by separately providing an auxiliary apparatus for certificating users. Japanese Patent Application Laid-open No. 2006-121726 for example has disclosed a technology for certificating on the both sides of the information processing apparatus and a service provider's apparatus by using the PIN.

SUMMARY OF THE INVENTION

However, the technology for preventing illegal use of data of the past in the information processing apparatus requires to separately provide an apparatus for certification.

Still more, the information processing apparatus for which the PIN has been inputted can hold the PIN until when supply of power to the carried IC chip is disconnected. In case when the IC chip obtains power by carrier wave transmitted from the reader/writer here, the supply of power is disconnected when the information processing apparatus moves to a place where the carrier wave does not reach. Thus, the holding of the PIN is cancelled and the access control is automatically set.

However, in case when the information processing apparatus has a power source, e.g., a buttery, and obtains power from the power source, the holding of the PIN may be cancelled only when the information processing apparatus comes to a special condition such as "residual power of the power source is zero", when the supply of power from the power source is intentionally stopped, e.g., "when the power source of the information processing apparatus is turned OFF" or when the user makes a predetermined manipulation such as "user resets access control". That is, the information processing apparatus of the past has a case when the access control can be automatically set even when data processing with the reader/writer is completed.

Therefore, the information processing apparatus of the past is unable to prevent illegal use by the third party.

In view of the problem described above, the invention has been made to provide a new and improved information processing system, a reader/writer, an information processing apparatus, an access control management method and a program capable of setting access control to the information processing apparatus after completing data processing between the information processing apparatus and the reader/writer.

According to an embodiment of the present invention, there is provided an information processing system that includes a reader/writer and an information processing apparatus. The reader/writer includes a processing section for executing service processing performed between the reader/writer and the information processing apparatus. The reader/writer includes a processing completion determining section for determining whether or not the process of the service processing has been completed. The reader/writer also includes a control information generating section for generating control information for causing the information processing apparatus to set access control for an internal memory held within the IC chip, depending on the determination result from the processing completion determining section. The reader/writer also includes a control information transmitting section for transmitting the generated control information to the information processing apparatus. The information processing apparatus includes the internal memory held within the IC chip and having an access control area for which the access control may be set. The information processing apparatus also includes an in-chip communication section held within the IC chip to receive the control information transmitted from the reader/writer. The information processing apparatus also includes an internal memory managing section for storing the received control information in the internal memory. The information processing apparatus also includes a control information obtaining section for obtaining the control information from the internal memory. The information processing apparatus also includes an access control managing section for setting the access control for the access control area based on the obtained control information.

A reader/writer composing the information processing system may have a processing section, a processing completion determining means, a control information generating section and a control information transmitting section. The processing section may perform various data processing (service processing) performed between the reader/writer and the information processing apparatus. The processing completion determining section may determine whether or not a process of the service processing has been completed. The control information generating section may generate control information for causing the information processing apparatus to set access control for an internal memory held within the IC chip, depending on the determination result from the processing completion determining section. The control information transmitting section may transmit the control information generated by the control information generating section to the information processing apparatus.

Further, an information processing apparatus composing the information processing system may include an internal memory, an in-chip communication section, an internal memory managing section, a control information obtaining section and an access control managing section The internal memory may be held within the IC chip and may have an access control area for which access control may be set. The in-chip communication section may be held within the IC chip and may receive the control information transmitted from the reader/writer. The internal memory managing section may store the control information received from the in-chip communication section to the internal memory. The control information obtaining section may obtain the control information from the internal memory. The access control managing section may set the access control to the access control area based on the control information obtained from the internal memory.

The information processing system for setting the access control to the information processing apparatus after completing data processing between the information processing apparatus and the reader/writer may be realized by arranging as described above.

According to the embodiments of the present invention described above, there is proved a reader/writer capable of non-contact communicating with an information processing apparatus being equipped with an IC chip, including a processing section for executing service processing performed between the reader/writer and the information processing apparatus, a processing completion determining section for determining whether or not a process of the service processing has been completed, a control information generating section for generating control information for causing the information processing apparatus to set access control for an internal memory held within the IC chip, depending on the determination result from the processing completion determining section and a control information transmitting section for transmitting the generated control information to the information processing apparatus.

The reader/writer may have the processing section, the processing completion determining means, the control information generating section and the control information transmitting section. The processing section may perform various data processing (service processing) performed between the reader/writer and the information processing apparatus. The processing completion determining section may determine whether or not a process of the service processing has been completed. The control information generating section may generate control information for causing the information processing apparatus to set access control for an internal memory held within the IC chip, depending on the determination result from the processing completion determining section. The control information transmitting section may transmit the control information generated by the control information generating section to the information processing apparatus. It becomes possible to generate the control information that causes the information processing apparatus to set the access control, depending on the completion of the data processing (service processing) between the information processing apparatus and the reader/writer, to transmit the generated control information to the information processing apparatus and to cause the information processing apparatus to set the access control by constructing as described above.

According to the embodiments of the present invention described above, there is provided an information processing apparatus being equipped with an IC chip that is capable of non-contact communication with a reader/writer. The information processing apparatus includes an internal memory held within the IC chip and having an access control area for which access control may be set, an in-chip communication section held within the IC chip to receive the control information transmitted from the reader/writer to set access control in the internal memory, an internal memory managing section for storing the received control information in the internal memory, a control information obtaining section for obtaining the control information from the internal memory and an access control managing section for setting the access control for the access control area based on the obtained control information.

Further, The information processing apparatus may include the internal memory, the in-chip communication section, the internal memory managing section, the control information obtaining section and the access control managing section. The internal memory may be held within the IC chip and may have an access control area for which access control may be set. The in-chip communication section may be held within the IC chip and may receive the control information transmitted from the reader/writer. The internal memory managing section may store the control information received from the in-chip communication section to the internal memory. The control information obtaining section may obtain the control information from the internal memory. The access control managing section may set the access control to the access control area based on the control information obtained from the internal memory. It becomes possible to set the access control automatically to the access control area in the internal memory after completing the data processing (service processing) between the information processing apparatus and the reader/writer by constructing as described above.

The information processing apparatus may further include a control information reception notifying section for notifying that the control information transmitted from the reader/writer has been received and the control information obtaining section may obtain the control information from the internal memory, depending on the notification from the control information reception notifying section.

Such arrangement allows the access control to be automatically set in the access control area in the internal memory, depending on the reception of the control information.

Further, the information processing apparatus may be a portable communication apparatus.

According to the embodiments of the present invention described above, there is provided an access control managing method of a reader/writer capable of non-contact communicating with an information processing apparatus being equipped with an IC chip. The method includes the steps of executing service processing performed between the reader/writer and the information processing apparatus, determining whether or not a process of the service processing has been completed, generating control information for setting access control to an internal memory of the information processing apparatus, depending on the determination result of the determining step and transmitting the control information generated in the generating step to the information processing apparatus.

It becomes possible to generate the control information for causing the information processing apparatus to set the access control, depending on the completion of the data processing (service processing) between the information processing apparatus and the reader/writer, to transmit the generated control information to the information processing apparatus and to cause the information processing apparatus to set the access control by using such method.

According to the embodiments of the present invention described above, there is provided an access control managing method of an information processing apparatus being equipped with an IC chip that is capable of non-contact communication with a reader/writer and having an internal memory having within the IC chip an access control area for which access control may be set. The method includes the steps of receiving control information transmitted from the reader/writer for setting access control in the internal memory, storing the control information received in the receiving step in the internal memory, detecting that the control information has been received in the receiving step, obtaining the control information from the internal memory when the control information is detected in the detecting step and setting the access control for the access control area of the internal memory based on the control information obtained in the obtaining step.

It becomes possible to set the access control to the information processing apparatus after completing the data processing between the information processing apparatus and the reader/writer by using the method described above.

According to the embodiments of the present invention described above, there is provided a program for use in a reader/writer capable of non-contact communicating with an information processing apparatus being equipped with an IC chip. The program makes a computer execute steps of executing service processing performed between the reader/writer and the information processing apparatus, determining whether or not a process of the service processing has been completed, generating control information for setting access control to an internal memory of the information processing apparatus, depending on the determination result of the determining step a transmitting the control information generated in the generating step to the information processing apparatus.

It becomes possible to generate the control information for causing the information processing apparatus to set the access control, depending on the completion of the data processing (service processing) between the information processing apparatus and the reader/writer, to transmit the generated control information to the information processing apparatus and to cause the information processing apparatus to set the access control by such program.

According to the embodiments of the present invention described above, there is provided a program for use in an information processing apparatus being equipped with an IC chip that is capable of non-contact communication with a reader/writer and having an internal memory having within an access control area for which access control may be set the IC chip. The program makes a computer executes steps of receiving control information transmitted from the reader/writer for setting access control in the internal memory, storing the control information received in the receiving step in the internal memory; detecting that the control information has been received in the receiving step, obtaining the control information from the internal memory when the control information is detected in the detecting step and setting the access control for the access control area of the internal memory based on the control information obtained in the obtaining step.

It becomes possible to set the access control to the information processing apparatus after completing the data processing between the information processing apparatus and the reader/writer by such program.

Thus, according to the embodiments of the present invention described above, the access control may be set to the information processing apparatus after completing the data processing between the information processing apparatus and the reader/writer.

DETAILED DESCRIPTION OF THE PREFERRED EMBODIMENTS

Figure 1B:
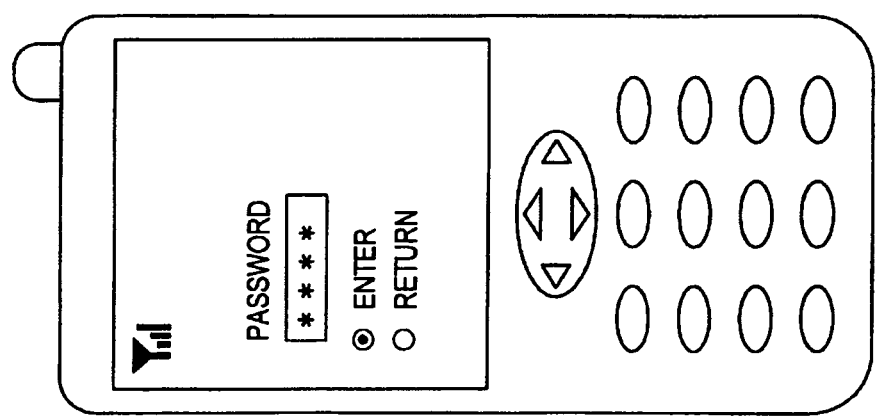
FIGS. 1A and 1B are explanatory drawings for explaining one exemplary problem of an information processing apparatus of the past.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

Problems in Information Processing Apparatuses of Past

One example of problems in information processing apparatuses of the past will be explained first before explaining an information processing system according to an embodiment of the invention.

Figure 1A:
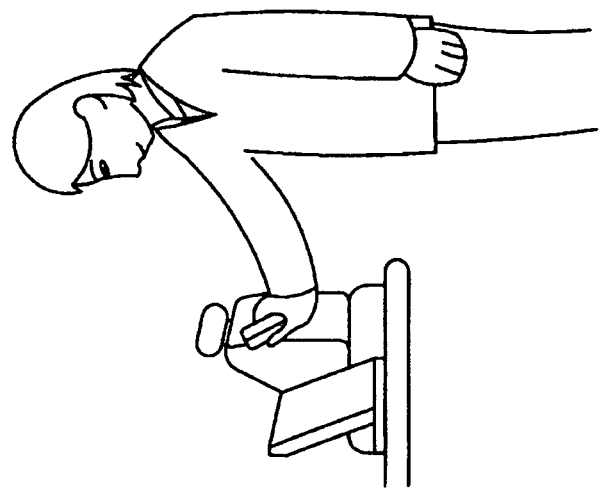

FIGS. 1A and 1B are explanatory drawings for explaining one exemplary problem of an information processing apparatus of the past and exemplify cases of inputting and using (shopping by using electronic money) PIN by a portable phone being equipped with an IC chip of the past.

As shown in FIG. 1A, a user of the portable phone of the past can input a password (PIN) from a predetermined screen. Access control to data of electronic money stored in the portable phone is released when the password (PIN) is inputted.

Then, the user who has inputted the password can finish payment by using the electronic money by holding the portable phone to a reader/writer provided at a place where a serviced is provided as shown in FIG. 1B.

However, even when the payment is completed in FIG. 1B, access control to the data of the electronic money is not automatically set again in the portable phone of the past. It is because the communication related to the payment (data processing) is a communication between the reader/writer and the IC chip and the reader/writer is unable to inform that the payment (data processing) has been completed to the portable phone, e.g., a structural element other than the IC chip such as a portable phone application). That is, the communication related to the payment is not a communication between the reader/writer and the portable phone.

Accordingly, the access-control released state remains in the portable phone of the past unless the user makes a specific manipulation of resetting the access control for example or such a special condition that a residual power of a battery of the portable phone is zeroed occurs.

Therefore, a third party who obtained the portable phone of the past can pay (illegal use) by using the electronic money stored in the portable phone as shown in FIG. 1B when the access control of the portable phone is being released. Therefore, it is unable to prevent such illegal use of the third party by the portable phone being equipped with the IC chip of the past.

First Embodiment

Figure 2:
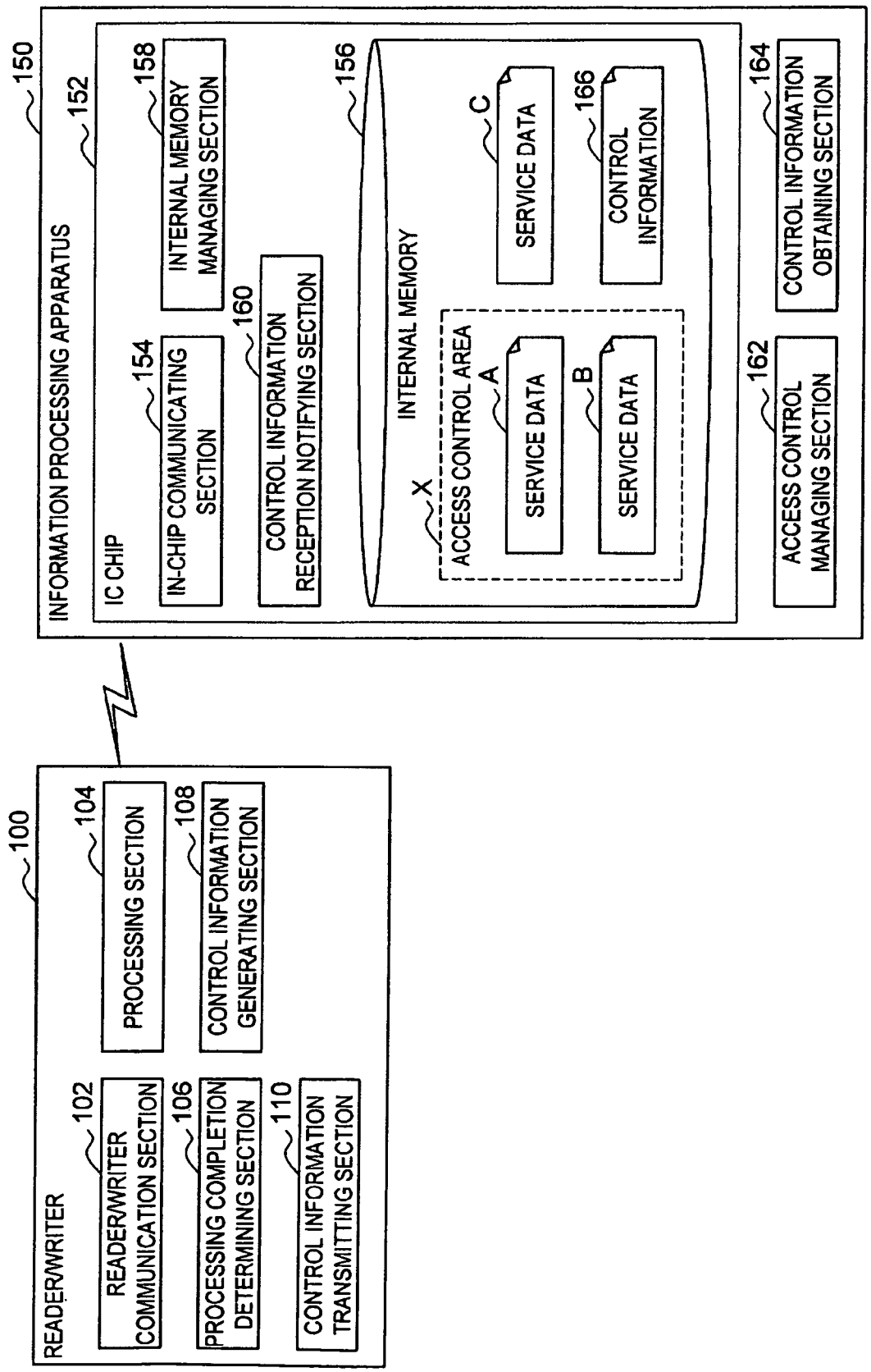
FIG. 2 is a block diagram showing an information processing system according to one embodiment of the invention.

Next, the information processing system of a first embodiment of the invention will be explained. FIG. 2 is a block diagram showing the information processing system according to one embodiment of the invention.

As shown in FIG. 2, the information processing system according to the first embodiment of the invention may have a reader/writer 100 and an information processing apparatus 150. Here, the reader/writer 100 and the information processing apparatus 150 can communicate in non-contact by using magnetic field (carrier wave) of specific frequency such as 13.56 MHz for example.

The reader/writer 100 may have a reader/writer communication section 102, a processing section 104, a processing completion determining section 106, a control information generating section 108 and a control information transmitting section 110.

The reader/writer 100 may also have a reader/writer control section (not shown) composed of a MPU (Micro Processing Unit) and others for controlling the whole reader/writer 100, a ROM (Read Only Memory) for recording control data such as programs used by the reader/writer control section and operational parameters and others, a nonvolatile memory and a volatile memory, a storage section (not shown) such as a magnetic recording medium and others. The reader/writer 100 can also connect the respective components by a bus as a transmission path of data.

The reader/writer communication section 102 is a section for communicating with the information processing apparatus 150 by using carrier waves and transmits/receives various data to/from the information processing apparatus 150 such as various commands, e.g., a data read command and data write command to data stored within an IC chip of the information processing apparatus 150. Here, the reader/writer communication section 102 may be composed of a resonance circuit made of a coil having a predetermined inductance as a transmission/receiving antenna and a capacitor having a predetermined electrostatic capacity. Although the processing section 104 described later for example may generate and control the transmission of the various commands and data to be transmitted by the reader/writer communication section 102, the reader/writer control section (not shown) may also carry them out.

The processing section 104 can perform data processing (referred to as "service processing" hereinafter) related to a service provided via communication between the reader/writer 100 and the information processing apparatus 150. Here, although service processing includes data processing related to a payment using the electronic money stored in the information processing apparatus (e.g., a balance conforming process and a drawing process of the electronic money), a confirming process (e.g., a collation process such as confirmation of date and others) of a ticket stored in the information processing apparatus and others, the service processing is not limited to them. The processing section 104 may be also provided with a MPU and may have a function of the reader/writer control section that controls the whole reader/writer 100.

The processing completion determining section 106 may determine whether or not the service process with the information processing apparatus 150 has been completed. The determination of the processing completion determining section 106 may be made by using responses from the information processing apparatus 150 to a series of various commands related to a service process such as a data read command and a data write command transmitted from the reader/writer communication section 102 for example. Here, the responses from the information processing apparatus 150 include processing result information indicating that various processes in the information processing apparatus 150 have been normally completed respectively for example, the response is not limited to that. The processing completion determining section 106 can determine that service processing has been completed when a response to a final command in the series of various commands shows that the command has been normally completed.

The control information generating section 108 can generate control information for setting access control to an internal memory 156 provided in an IC chip 152 of the information processing apparatus 150 when the processing completion determining section 106 determines that the service process has been completed. Concrete examples of the control information will be described later.

The control information transmitting section 110 can transmit the control information generated by the control information generating section 108 to the IC chip 152 of the information processing apparatus 150. Here, although the control information transmitting section 110 can transmit the control information through the reader/writer communication section 102, the control information transmitting section 110 may be provided separately with a communication section for transmitting control information beside that.

By being constructed as described above, the reader/writer 100 can generate the control information for setting access control to the internal memory 156 provided in the IC chip 152 of the information processing apparatus 150 and can transmit it to the information processing apparatus 150.

[Information Processing Apparatus 150]

The information processing apparatus 150 may be provided with the IC chip 152, an access control management section 162 and a control information obtaining section 164.

The information processing apparatus 150 may be provided with a control section (not shown) composed of a MPU and others for controlling the whole information processing apparatus 150, a ROM (Read Only Memory) for recording control data such as programs and computation parameters to be used by the control section, a RAM (Random Access Memory) for primarily storing programs and others to be executed by the control section, a manipulation section (not shown) for enabling the user to make predetermined manipulation such as PIN input, an internal power source (not shown) for supplying power to the respective components of the information processing apparatus 150, a storing section (not shown) capable of storing applications and others used in the information processing apparatus 150 and others. The information processing apparatus 150 can connect the respective components by a bus as a data transmission path. Here, the manipulation section (not shown) includes buttons, directional keys, a rotary selector such as a jog dial or a their combination, the manipulation section is not limited to them. Further, the storage section (not shown) include a magnetic recording medium such as a hard disk and a nonvolatile memory such as a flash memory for example, the storage section is not limited to them.

The IC chip 152 is what various parts related with the communication with the reader/writer 100 are realized by an integrated circuit and may have tampering resistance. The IC chip 152 may also perform various data processing, depending on commands from the outside of the IC chip 152 such as various commands from the reader/writer 100 or the components of the information processing apparatus 150 other than the IC chip 152 (e.g., the access control managing section 162 and the control section).

<IC Chip 152>

The IC chip 152 may be provided with an in-chip communication section 154, the internal memory 156, an internal memory managing section 158 and a control information reception notifying section 160. The IC chip 152 may be provided also with a data receiving section (not shown) for sampling (decoding) a binalized signal of High and Low levels from a carrier wave received by the in-chip communication section 154, an in-chip power source section (not shown) for outputting driving voltage for driving the internal memory managing section 158 and others based on the carrier wave received by the in-chip communication section 154, a clock generating section (not shown) for generating a rectangular clock signal, a ROM for storing management data and others to be used by the internal memory managing section 158, a UART (Universal Asynchronous Receiver Transmitter) that plays a role of an interface with the components other than the IC chip 152.

The in-chip communication section 154 has a resonance circuit composed of a coil having predetermined inductance as a transmitting/receiving antenna and a capacitor having predetermined electrostatic capacity and may receive the carrier wave transmitted from the reader/writer 100. The in-chip communication section 154 can communicate with the reader/writer 100 via the carrier wave by modulating load to change impedance of the information processing apparatus 150 seen from the reader/writer 100.

The internal memory 156 is a storage section held within the IC chip 152 and may have tampering resistance. The internal memory 156 can store data for effecting functions of the information processing apparatus or data for receiving a service by using the IC chip provided in the information processing apparatus (referred to as "service data" hereinafter) and control information transmitted from the reader/writer for example. Here, the service data includes data of electronic money value, data for certificating an individual, data of tickets, data, depending on a discount coupon and others, the service data is not limited to those described above.

The internal memory 156 may also have an access control area X as shown in FIG. 2. The access control area X here is a storage area capable of setting (and releasing) access control requiring certification by PIN and others for example in reading and writing processes to the service data stored within the access control area X. FIG. 2 shows an example in which the service data A thorough C and control information 155 are stored in the internal memory 156 and the service data A and B among them are stored in the access control area X.

Note that although the internal memory 156 includes a nonvolatile memory such as an EEPROM (Electronically Erasable and Programmable Read Only Memory), a flash memory, a MRAM (Magneto-resistive Random Access Memory), a FeRAM (Ferroelectric Random Access Memory), a PRAM (Phase change Random Access Memory) and others for example, the internal memory 156 is not limited to those described above.

The internal memory managing section 158 may control various processes to the internal memory 156 such as various commands such as data read and write commands from the reader/writer 100 or various commands from the control section (not shown) of the information processing apparatus, an authorizing process of the inputted PIN and others.

The control information reception notifying section 160 may notify that control information has been transmitted from the reader/writer 100 to the components other than the IC chip 152 (e.g., the control information obtaining section 164 described later) from the IC chip 152 within the information processing apparatus 150. A method for notifying that the control information has been received of the control information reception notifying section 160 includes changing a signal level of a predetermined terminal from high level to low level. Here, the predetermined terminal may be a part of UART for example or may be a terminal dedicated for notifying that the control information has been received. Note that it is needless to say that the method for notifying that the control information has been received of the present embodiment of the invention is not limited to that described above. For example, the control information reception notifying section 160 may notify that the control information has been received by transmitting predetermined digital data indicating that the control information has been transmitted to the components other than the IC chip 152.

Figure 3:
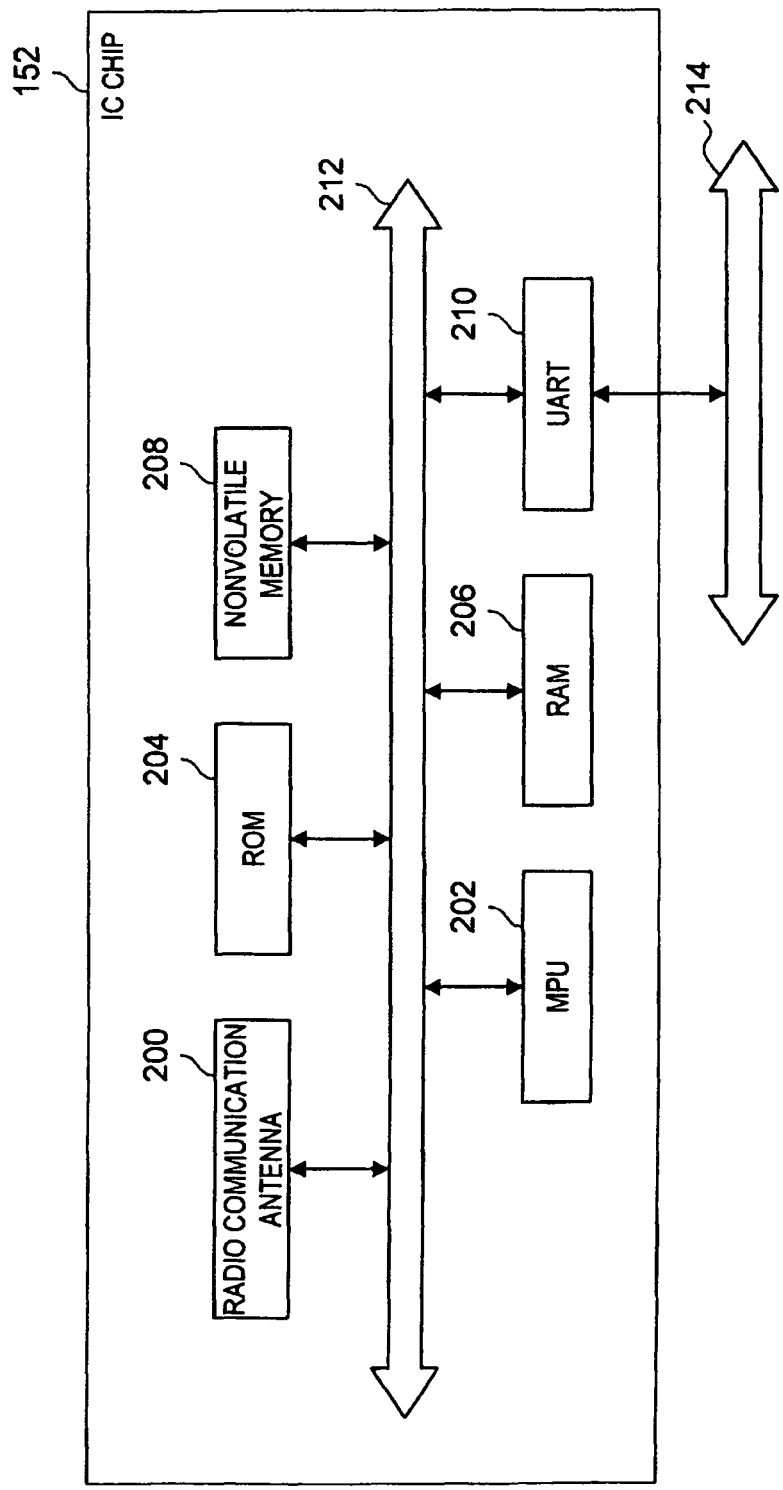
FIG. 3 is an explanatory diagram showing one exemplary outline of a hardware structure of an IC chip according the embodiment of the invention.

By having the configuration as described above, the IC chip 152 can communicate with the reader/writer 100 in noncontact. Here, a schematic example of a hardware structure of the IC chip 152 will be explained. FIG. 3 is an explanatory diagram showing one exemplary outline of the hardware structure of the IC chip 152 according the embodiment of the invention.

Referring now to FIG. 3, the IC chip 152 may be provided with a radio communication antenna 200, a MPU 202, a ROM 204, a RAM 206 a nonvolatile memory 208 and a UART 210 for example and the respective components are connected by a bus 212. The IC chip 152 is connected with the bus 214 of the information processing apparatus via the UART 210. In FIG. 3, the radio communication antenna 200 may correspond to the in-chip communication section 154 in FIG. 2, the MPU 202 may correspond to the internal memory managing section 158 in FIG. 2, the nonvolatile memory 208 may correspond to the internal memory 156 in FIG. 2 and the UART 210 may correspond to the control information reception notifying section 160, respectively. The ROM 204 may store control data such as programs and computation parameters to be used by the MPU 202 and the RAM 206 may primarily store programs to be executed by the MPU 202. Note that it is needless to say that the hardware structure of the IC chip 152 of the embodiment of the invention is not limited to that shown in FIG. 3.

The information processing apparatus 150 will be explained again by making reference to FIG. 2. The access control managing section 162 may control the access control in the internal memory 156 by transmitting a PIN collating request for releasing the access control set in the access control area X of the internal memory 156 and an access control setting request for setting the access control in the access control area X of the internal memory 156 to the IC chip 152. Here, the access control managing section 162 is connected with the IC chip 152 via the UART provided in the IC chip 152.

The access control managing section 162 can also transmit the access control setting request to the IC chip 152 based on the control information (control information transmitted from the reader/writer 100) stored in the internal memory 156 of the IC chip 152. More specifically, the control information obtaining section 164 described later obtains the control information from the IC chip 152 for example and the access control managing section 162 may transmit the access control setting request to the IC chip 152 based on the obtained control information. Note that its detail will be explained in a section of an access control management method of the embodiment of the invention described later by using FIG. 4.

Based on the control information receiving notification notified from the control information reception notifying section 160, the control information obtaining section 164 may obtain the control information transmitted from the reader/writer 100 and stored in the internal memory 156 of the IC chip 152 out of the internal memory 156 of the IC chip 152 and may pass the obtained control information to the access control managing section 162. Here, although the control information obtaining section 164 may obtain the control information when a signal level of a predetermined terminal changes from high level to low level for example, its method is not limited to what described above. The control information obtaining section 164 is connected with the IC chip 152 via the UART provided in the IC chip 152 for example.

By having the configuration as described above, the information processing apparatus 150 may set the access control to the access control area X of the internal memory 156 based on the control information transmitted from the reader/writer 100.

[Access Control Management Method]

Figure 4:
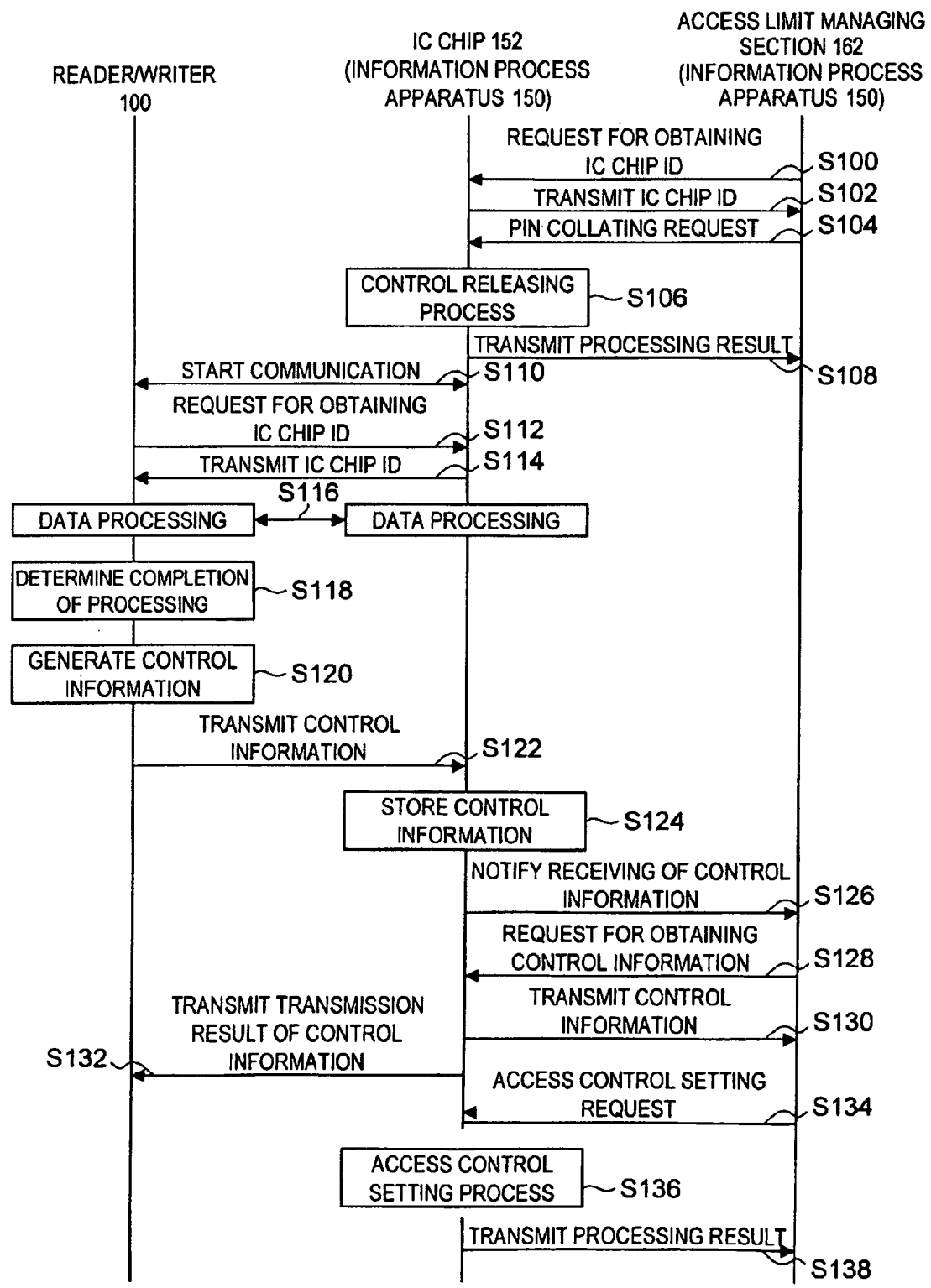
FIG. 4 is an explanatory diagram showing one example of an access control managing method according to the embodiment of the invention.

Next, the access control managing method according to the embodiment of the invention will be explained. FIG. 4 is an explanatory diagram showing one example of the access control managing method according to the embodiment of the invention. Here, FIG. 4 shows processes after when the user has inputted the PIN (i.e., processes on and after the process in FIG. 1A) and the processes of steps S100 through 108 show processes for releasing the access control by the inputted PIN.

When the PIN is inputted, the access control managing section 162 transmits a request for obtaining the IC chip ID to the IC chip 152 (S100). The IC chip ID obtained in the step S100 may be used in an access control setting request (S134) described later for example. The access control managing section 162 is also connected with the IC chip 152 via the UART provided in the IC chip 152 for example.

The IC chip 152 that has received the request transmitted from the access control managing section 162 for obtaining the IC chip ID transmits the IC chip ID to the access control managing section 162 (S102). The IC chip ID transmitted in the step S102 is a unique ID assigned to the IC chip 152 for identifying the IC chip for example.

The access control managing section 162 that has received the IC chip ID transmitted from the IC chip 152 in the step S102 transmits a request for collating the PIN to the IC chip 152 (S104). The request for collating the PIN transmitted from the access control managing section 162 in step S 104 may contain a PIN collating command and the PIN (the inputted PIN) used for collation.

Receiving the request for collating the PIN transmitted from the access control managing section 162 in step S104, the IC chip 152 performs a process for releasing control of the access control, depending on the request for collating the PIN (S106). Then, the IC chip 152 transmits a processing result of the control releasing process in step S106 to the access control managing section 162 (S108). Here, although the processing result of the control releasing process may be indicated by data of one bit indicating whether or not the control is released (e.g., "0" indicating that the releasing of control has failed and "1" indicating that the releasing of control has been done successfully), the indication of the processing result is not limited to that described above.

The access control set in the access control area X of the internal memory 156 may be released by the processes shown in steps S100 through S108 in the information processing apparatus 150. Supposing that the access control set in the access control area X has been released by the processes shown in the steps S100 through S108, the access control managing method of the embodiment of the invention will be successively explained below.

Then, a communication between the reader/writer 100 and the IC chip 152 is started (S110). Here, the communication in the step S110 is started when the in-chip communication section 154

When the communication is started in the step S110, the reader/writer 100 transmits a request for obtaining the IC chip ID to the IC chip 152 (S112). Here, the IC chip ID obtained in the step S112 may be used in a process for generating at (S120) described later for example.

Receiving the request for obtaining the IC chip ID transmitted from the reader/writer 100, the IC chip 152 transmits the IC chip ID to the reader/writer 100 (S114).

Receiving the IC chip ID transmitted from the IC chip 152 in the step S114, the reader/writer 100 transmits a request to process various data processing to the IC chip 152 and data processing (service processing) is carried between the reader/writer 100 and the IC chip 152 (S116). Then, the reader/writer 100 determines completion of the data processing (service processing) (S118).

Determining that the data processing (service processing) has been completed in the step S118, the reader/writer 100 generates control information (S120). Then, the reader/writer 100 transmits the control information generated in the step S120 to the IC chip 152 (S122).

<Detail of Processes Related to Transmission of Control Information>

Figure 5:
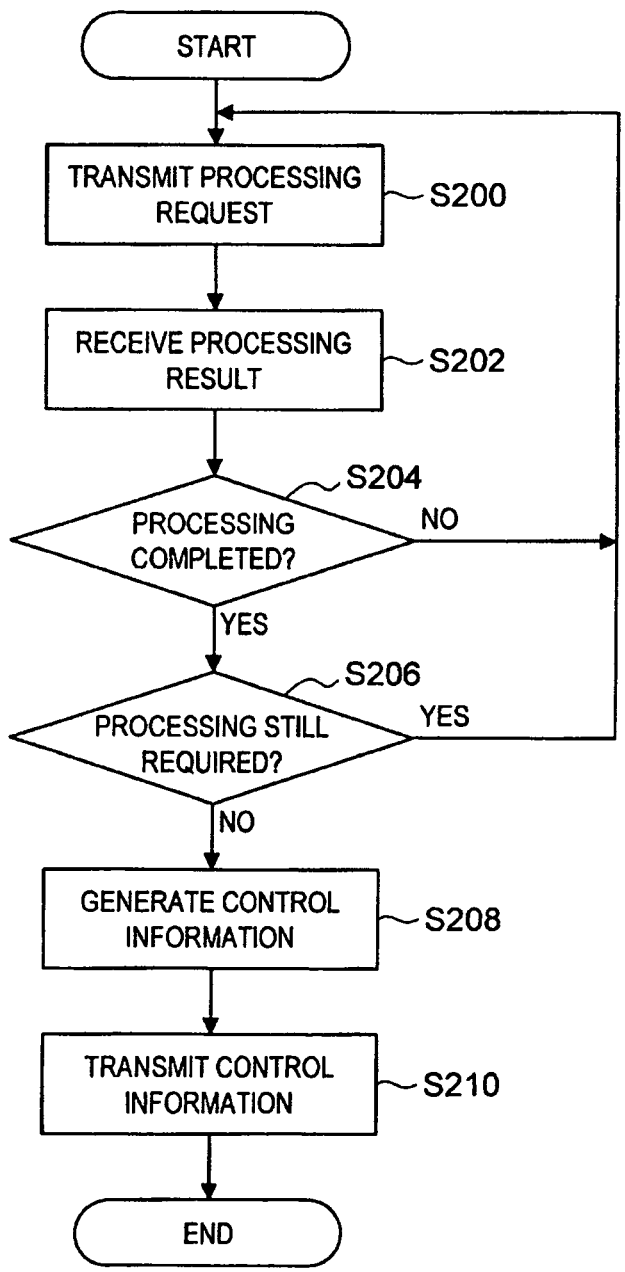
FIG. 5 is a flowchart showing processes related to transmission of control information in the embodiment of the invention.

As shown in the steps S116 through S122, the reader/writer 100 may generate the control information after completing the data processing (service processing) between the reader/writer 100 and the IC chip 152 and may transmit the generated control information to the IC chip 152. Processes (steps S116 through S122) related to transmission of the control information in the embodiment of the invention will be explained below in detail. FIG. 5 is a flowchart showing the processes in the reader/writer 100 related to transmission of the control information in the embodiment of the invention. It is also needless to say that FIG. 5 is one exemplary processes related to the transmission of the control information of the embodiment of the invention.

At first, the reader/writer 100 transmits the request to process the various data processing to the IC chip 152 (S200). Here, although the various data processing includes a process for reading data and a process for writing data, the various data processing is not limited those described above. Further, data to be written for example may be transmitted in the step S200.

The reader/writer 100 receives a processing result from the IC chip 152 to the processing request transmitted in the step S200 (S202). Here, although the processing result transmitted from the IC chip 152 may be indicated by data of one bit indicating whether or not the various data processing has been completed (e.g., "0" indicating that the data processing is not completed and "1" indicating that the data processing has been completed), the indication of the processing result is not limited to that described above.

Based on the processing result received in the step S202, the reader/writer 100 determines whether or not the processes have been completed in the IC chip 152 (S204). When the reader/writer 100 determines that the processing has not been completed in the step S204, the reader/writer 100 transmits a processing request to process again to the IC chip 152 (S200).

When the reader/writer 100 determines that the processing has been completed in the step S204, the reader/writer 100 determines further whether more process is required (S206). The determination made in the step S206 may be determined to be "completed" when a series of processes specified in advance in the reader/writer 100. Here, the series of processes described above may include the "the data writing process" and "data reading process" of written data, processes are not limited to those described above.

When it is determined that more processing is required in the step S206, the reader/writer 100 transmits a request to process related to next data processing to the IC chip 152 (S200).

When it is determined that more processing is not necessary in the step S206, the reader/writer 100 generates control information (S208). Here, the control information is information that causes the information processing apparatus 150 to set access control (more specifically, information for setting the access control in the access control area X of the internal memory 156 of the information processing apparatus 150).

Figure 6:
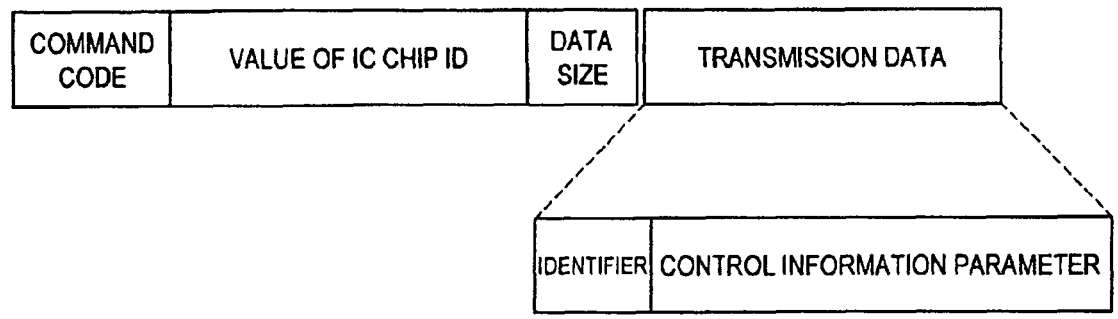
FIG. 6 is an explanatory diagram showing one example of control information according to the embodiment of the invention.

FIG. 6 is an explanatory diagram showing one example of control information according to the embodiment of the invention. As shown in FIG. 6, the control information of the embodiment of the invention may contain a "command code" for identifying the information, a "value of IC chip ID" for defining an IC chip capable of using the information, a "data size" specifying a data size of the information and "transmission data" that is a substance of the information.

The control information of the embodiment of the invention may contain also an "identifier" for identifying the transmission data and "control data parameters" that is the substance of the control information as the "transmission data". Here, although the "control data parameters" of the embodiment of the invention may include "address information" of the access control area X held by the internal memory 156 of the information processing apparatus 150, an "access control setting command" and a "standby time" that is a processing waiting time until the access control is set for example, the control information parameters are not limited to those described above. The address information of the access control area X may be also an address specified in advance or the reader/writer 100 may obtain from the IC chip 152 for example.

Based on the IC chip ID obtained in the step S114 in FIG. 3, the reader/writer 100 can generate the control information to the specific information processing apparatus (the information processing apparatus 150 in FIG. 3).

In FIG. 5 again, the reader/writer 100 transmits the control information generated in the step S208 to the IC chip 152 of the information processing apparatus 150 (S210).

As the processing related to the transmission of the control information has been explained in detail by using FIG. 5 above, the reader/writer 100 may generate the control information for setting the access control and may transmit it to the IC chip 152 after completing the communication with the IC chip 152 relating the data processing.

The processes on and after a step S124 will be explained by making reference to FIG. 4 again.

Receiving the control information transmitted from the reader/writer 100 in the step S122, the IC chip 152 stores the received control information to the internal memory 156 (S124). Then, the IC chip 152 notifies the control information receiving notification indicating that the control information has been received to the outside of the IC chip 152 (within the information processing apparatus 150) (S126). Here, the control information reception notifying section 160 may carry out the notification in the step S126 for example. It is noted that although FIG. 4 shows that the control information receiving notification is notified directly from the IC chip 152 to the access control managing section 162 in the step S126, the embodiment of the invention is not limited to that described above and the notification may be notified indirectly via the control information obtaining section 164.

<Detail of Process related to Setting of Access Control>

Figure 7:
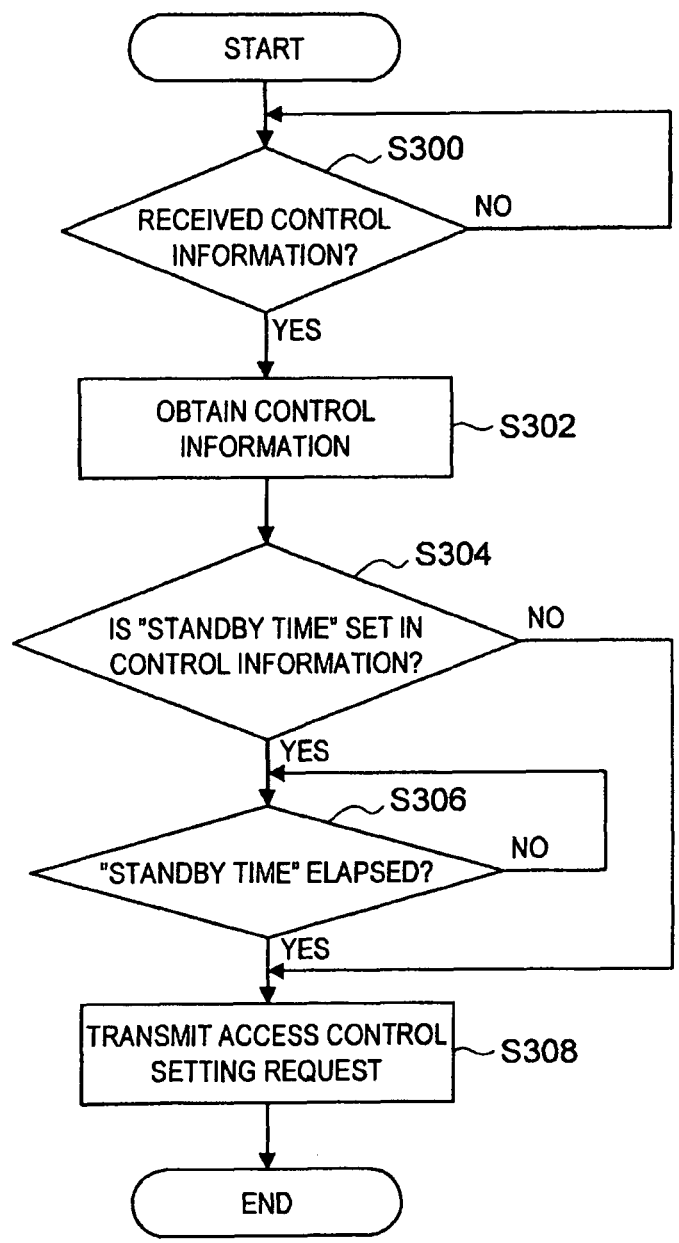
FIG. 7 is a flowchart showing processes related to setting of access control in the embodiment of the invention.

Here, before explaining processes on and after the step S128 by using FIG. 4, a detail of processes (steps S128 through S134) related to setting of the access control of the embodiment of the invention will be explained. FIG. 7 is a flowchart showing processes related to setting of the access control in the embodiment of the invention and shows processes in the information processing apparatus 150. Noted that it is needlessly to say that the processes in FIG. 7 are exemplary processes related to the setting the access control of the embodiment of the invention.

At first, the control information obtaining section 164 determines whether or not the control information has been received (S300). Here, the determination in the step S300 may carried out by determining whether a signal level of a predetermined terminal has changed to high level or low level for example, the determination method is not limited to that described above. When no determination that the control information has been received is made in the step S300, the process does not advance until the control information is received.

When the determination that the control information has been received is made in the step S300, the control information obtaining section 164 obtains the control information from the internal memory 156 (S302). The control information obtaining section 164 may also pass the obtained control information to the access control managing section 162 in a step S302.

Figure 8:
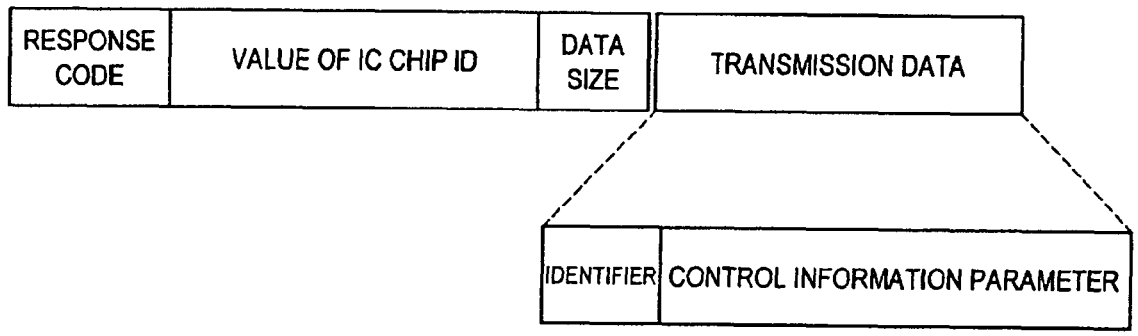
FIG. 8 is an explanatory diagram showing one example of control information used within an information processing apparatus of the invention.

FIG. 8 is an explanatory diagram showing one example of control information used within the information processing apparatus of the embodiment of the invention. As shown in FIG. 8, although the control information used within the information processing apparatus of the embodiment of the invention is basically similar information with the control information generated by the reader/writer 100 shown in FIG. 6, the "command code" in FIG. 6 is replaced with a "response code" for identifying information within the information processing apparatus when the control information in FIG. 8 is compared with the control information in FIG. 8. Here, the replacement from the "command code" to the "response code" may be made in storing the control information in the internal memory 156 or may be made when the control information is taken out of the internal memory 156. Note that it is needless to say that the "command code" for identifying information may be the same value with that of the "response code" for identifying information within the information processing apparatus.

Referring again to FIG. 7, the access control managing section 162 determines whether or not a "standby time" is set in the control information obtained in the step S302 (S304). The determination in the step S304 may be made by using the control information shown in FIG. 8 for example.

When it is determined that no "standby time" is set in the step S304, the access control managing section 162 transmits the access control setting request to the IC chip 152 (S308).

When it is determined that the "standby time" is set in the step S304, the access control managing section 162 determines whether or not the "standby time" has elapsed (S306). Here, although the determination in the step S306 may be made by using a clock generating section (not shown) such as a quartz and an oscillator held by the information processing apparatus 150 based on control information receiving time, the determination method is not limited to those described above.

When it is determined that the "standby time" has not elapsed in the step S306, the access control managing section 162 does not advance the process until when the "standby time" elapses.

When it is determined in the step S306 that the "standby time" has elapsed, the access control managing section 162 transmits the access control setting request to the IC chip 152 (S308).

As the detail of the processes related to setting of the access control by using FIG. 7 above, the information processing apparatus 150 may obtain the control information from the reader/writer 100 and may transmit the access control setting request based on the obtained control information.

Processes on and after the step S128 will be explained by making reference to FIG. 4 again.

When the control information receiving notification is made (directly or indirectly) from the IC chip 152 in the step S126, the access control managing section 162 transmits a request for obtaining the control information to the IC chip 152 (S128). Note that although FIG. 4 shows that the access control managing section 162 transmits the control information obtaining request, the control information obtaining section 164 may also transmit the request.

Receiving the control information obtaining request transmitted from the access control managing section 162 (or the control information obtaining section 164) in the step S128, the IC chip 152 transmits the control information stored to the internal memory 156 in the step S124 to the access control managing section 162 (or to the control information obtaining section 164) (S130).

When the IC chip 152 transmits the control information in the step S130, it transmits a control information transmission result to the reader/writer 100 (S132). Here, the control information transmission result may be a so-called log of transmission of the control information. Accordingly, the reader/writer 100 may recognize that the generated control information is transmitted to the components other than the IC chip 152 by the control information transmission result.

Obtaining the control information transmitted from the IC chip 152 in the step S130, the access control managing section 162 transmits an access control setting request to the IC chip 152 (S134). Here, the access control managing section 162 may obtain the control information from the control information obtaining section 164 that has received the control information transmitted in the step S132 for example. Further, when the "standby time" is set in the obtained control information as shown in FIG. 7, the access control managing section 162 may transmit the access control setting request after an elapse of the "standby time".

Receiving the access control setting request transmitted from the access control managing section 162 in the step S134, the IC chip 152 performs an access control setting process for setting the access control in the access control area X of the internal memory 156 based on the access control setting request (S136).

Then, the IC chip 152 transmits the processing result of the access control setting process in the step S136 to the access control managing section 162 (S138). Here, although the processing result of in the step S138 may be indicated by data of one bit indicating whether or not the access control setting process is completed (e.g., "0" indicating that the setting of access control has failed and "1" indicating that the setting of the access control has been successful), the indication of the processing result is not limited to that described above. Still more, when the processing result transmitted in the step S138 indicates that the access control setting process is not being completed, the access control managing section 162 may transmit the access control setting request again to the IC chip 152 (S134).

The information processing apparatus 150 may automatically set the access control to the access control area X of the internal memory 156 after completing the data processing (service processing) with the reader/writer 100 by using the access control managing method of the embodiment of the invention as shown in FIG. 4. Accordingly, the information processing apparatus 150 may prevent the service data such as electronic money stored in the access control area X from being illegally used by a third party.

As described above, according to the information processing system of the first embodiment of the invention, the reader/writer 100 generates the control information that is information for causing the information processing apparatus 150 to set access control and transmits the generated control information to the IC chip 152 of the information processing apparatus 150 when the data processing (service processing) between the information processing apparatus 150 and the reader/writer 100 is completed. Receiving the control information transmitted from the reader/writer 100, the IC chip 152 of the information processing apparatus 150 stores the control information to the internal memory 156 and notifies that the control information has been received to the outside of the IC chip 152 (within the information processing apparatus 150). Then, detecting the notification that the control information has been received, the control information obtaining section 164 obtains the control information from the internal memory 156 and the access control managing section 162 may set access control to the internal memory 156, depending on the obtained control information. Accordingly, the information processing apparatus 150 can automatically set the access control to the internal memory 156 after completing the data processing (service processing) with the reader/writer 100. Therefore, the information processing system of the first embodiment of the invention may prevent the service data such as the electronic money stored in the IC chip 152 of the information processing apparatus 150 from illegally used by the third party.

Further, although the component composing the information processing system of the first embodiment of the invention has been explained by exemplifying the information processing apparatus 150, the first embodiment of the invention is not limited to such mode and is applicable to portable communication apparatuses such as portable phones being equipped with the IC chip and computers such as UMPC (Ultra Mobile Personal Computer) being equipped with the IC chip.

(Program Related to the First Embodiment)

A program for functioning the reader/writer 100 of the first embodiment as a computer allows the control information that is information for causing the information processing apparatus 150 to set the access control, depending on completion of the data processing (service processing) between the information processing apparatus 150 and the reader/writer 100 to be generated and the generated control information to be transmitted to the IC chip 152 of the information processing apparatus 150 to set the access control in the internal memory 156 of the information processing apparatus 150.

A program for functioning the information processing apparatus 150 of the first embodiment as a computer also allows the access control to be automatically set to the internal memory 156 after completing the data processing (service processing) with the reader/writer 100.

Second Embodiment

The configuration of the first embodiment in which the reader/writer generates the control information and transmits the control information to the information processing apparatus, depending on the completion of the data processing (service processing) between the information processing apparatus and the reader/writer has been explained above. However, the embodiment of the invention is not limited to the configuration in which the reader/writer generates the control information and transmits the control information to the information processing apparatus. Then, a second embodiment of the invention in which one information processing apparatus connected with the reader/writer generates control information and transmits the control information to another information processing apparatus will be explained next.

Figure 9:
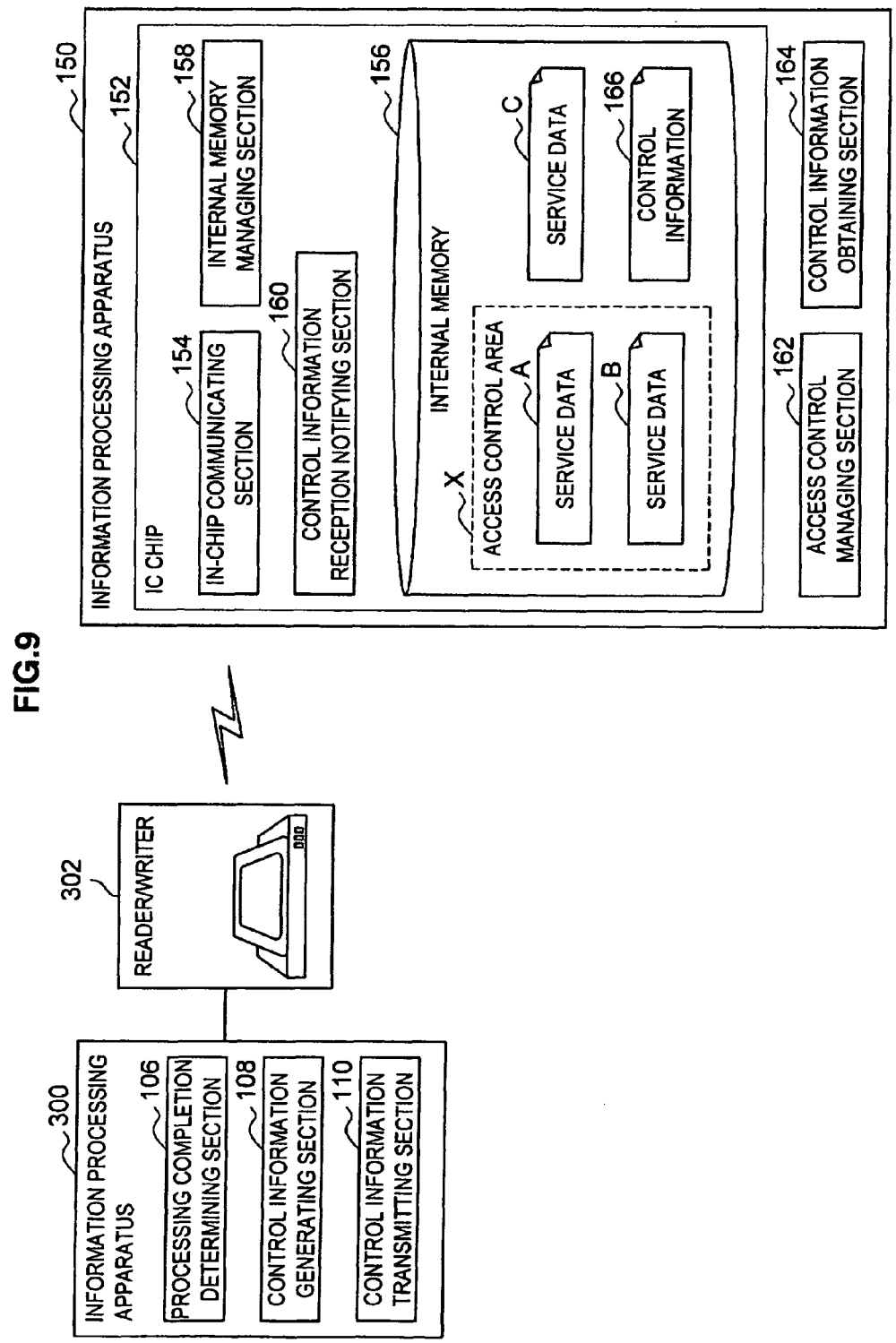
FIG. 9 is a block diagram showing an information processing system according to a second embodiment of the invention.

FIG. 9 is a block diagram showing an information processing system according to the second embodiment of the invention. As shown in FIG. 9, the information processing system of the second embodiment includes the information processing apparatus 150, a reader/writer 302 and an information processing apparatus 300 connected to the reader/writer 302. Here, the information processing apparatus 300 may be connected with the reader/writer 302 through a cable as shown in FIG. 9 or through a network line (not shown). Here, although the network line may be cable network such as a LAN (Local Area Network), a WAN (Wide area Network), a wireless network such as a WALN (Wireless Local Area Network) using MIMO (Multiple-Input Multiple-Output) or Internet using a communication protocol such as TCP/IP (Transmission Control Protocol/Internet Protocol), the present embodiment is not limited to those described above.

The information processing apparatus 150 has the same constructions and functions with the information processing apparatus of the first embodiment shown in FIG. 2 and may communicate with the reader/writer 302 in non-contact to process data (service processing) with the reader/writer 302.

The information processing apparatus 300 has a processing completion determining section 106, a control information generating section 108 and a control information transmitting section 110 and may communicate with the information processing apparatus 150 via the reader/writer 302 connected with the information processing apparatus 300.

The information processing apparatus 300 may include a control section (not shown) composed of a MPU and others for controlling the whole information processing apparatus 300, a ROM (not shown) for recording control data such as programs and computation parameters to be used by the control section, a RAM (not shown) for primarily storing programs to be executed by the control section, a manipulation section (not shown) manipulatable for the user, a storage section (not shown), a display section (not shown) and others. The respective components of the information processing apparatus 300 may be connected by a bus as a transmission path of data. Here, although the manipulation section (not shown) includes a manipulation input device such as a keyboard and a mouse for example, the manipulation section is not limited to them. Further, although the storage section (not shown) includes an magnetic recording medium such as a hard disk and a nonvolatile memory such as a flash memory for example, the storage section is not limited to them. The display section (not shown) may be a display unit such as a LCD (Liquid Crystal Display), an organic ElectroLuminescence display: or called as an OLRF display (Organic Light Emitting Diode display). It is noted that the manipulation section (not shown) and the display section (not shown) may be a combined section by composed of a touch screen.

Similarly to the processing completion determining section 106 of the reader/writer 100 of the first embodiment, the processing completion determining section 106 of the information processing apparatus 300 may determine whether the service processing between the information processing apparatus 150 and the reader/writer 302 has been completed.

In the same manner, the control information generating section 108 and the control information transmitting section 110 of the information processing apparatus 300 may be arranged to have the functions and configurations, depending on the control information generating section 108 and the control information transmitting section 110 of the reader/writer 100 of the first embodiment.

Accordingly, the information processing apparatus 300 may generate control information, depending on completion of the data processing (service processing between the information processing apparatus 150 and the reader/writer 302 and may transmit the control information to the information processing apparatus 150 via the reader/writer 302.

Receiving the ct transmitted from the reader/writer 302, the information processing apparatus 150 of the second embodiment can automatically set the access control to the internal memory 156 in the same manner with the information processing apparatus 150 of the first embodiment.

As described above, according to the information processing system of the second embodiment of the invention, the information processing apparatus 300 generates the control information that is information for causing the information processing apparatus 150 to set access control and transmits the generated control information to the IC chip 152 of the information processing apparatus 150 via the reader/writer 302 when the data processing (service processing) between the information processing apparatus 150 and the reader/writer 302 is completed. Receiving the control information transmitted from the reader/writer 302, the information processing apparatus 150 of the second embodiment can automatically set the access control to the internal memory 156 in the same manner with the information processing apparatus 150 of the first embodiment. Therefore, the information processing apparatus 150 of the second embodiment may set the access control automatically to the internal memory 156 after completing the data processing (service processing) with the reader/writer 302. Accordingly, the information processing system of the second embodiment of the invention may prevent the service data such as the electronic money stored in the IC chip 152 of the information processing apparatus 150 from illegally used by the third party.

Although the components composing the information processing system of the second embodiment of the invention has been explained by exemplifying the information processing apparatus 150, the second embodiment of the invention is not limited to such mode and is applicable to portable communication apparatuses such as portable phones being equipped with the IC chip and computers such as UMPC being equipped with the IC chip.

Further, although the component composing the information processing system of the second embodiment of the invention has been explained by exemplifying the information processing apparatus 300, the second embodiment of the invention is not limited to such mode and is applicable to computers such as a personal computer and a server.

(Program Related to Second Embodiment)

A program for functioning the information processing apparatus 300 of the second embodiment as a computer allows the control information that is information for causing the information processing apparatus 150 to set the access control, depending on completion of the data processing (service processing) between the information processing apparatus 150 and the302 to be generated and the generated control information to be transmitted to the IC chip 152 of the information processing apparatus 150 to set the access control in the internal memory 156 of the information processing apparatus 150.

A program for functioning the information processing apparatus 150 of the second embodiment as a computer also allows the access control to be automatically set to the internal memory 156 after completing the data processing (service processing) with the reader/writer 302.

It should be understood by those skilled in the art that various modifications, combinations, sub-combinations and alterations may occur depending on design requirements and other factors insofar as they are within the scope of the appended claims or the equivalents thereof.

For example, although the reader/writer 100 of the first embodiment shown in FIG. 2 has a structure having two sections related to communication of the reader/writer communication section 102 and the control information transmitting section 110, the invention is not limited to such structure and the reader/writer communication section may be integrated with the control information transmitting section as one section. The reader/writer of the first embodiment having the structure described above may also generate the control information, depending on the completion of the data processing (service processing) with the information processing apparatus and may transmit the generated control information to the IC chip of the information processing apparatus.

Although the information processing apparatuses 150 of the first and second embodiments shown in FIGS. 2 and 9 have the structure having the access control managing section 162 and the control information obtaining section 164, the invention is not limited to such structure and the access control managing section 162 may be integrated with the control information obtaining section 164 as one section. The information processing apparatus having such structure may also set the access control automatically to the internal memory 156 after completing the service processing between the information processing apparatus and the reader/writer.

The structures described above are one exemplary structures of the embodiments of the invention and naturally belong to a technological scope of the invention.

What is claimed is:

1. An information processing system that comprises a reader/writer and an information processing apparatus, the information processing apparatus being equipped with an IC chip that performs a non-contact communication with the reader/writer, the reader/writer including:
a processing section for executing service processing performed between the reader/writer and the information processing apparatus;
a processing completion determining section for determining whether or not a process of the service processing has been completed;
a control information generating section for generating control information for causing the information processing apparatus to store the control information in an internal memory of the information processing apparatus, the control information setting an access to an internal memory held within the IC chip, the control information being generated depending on a determination result indicating that the process of the service processing is completed; and
a control information transmitting section for transmitting the generated control information to the information processing apparatus; and the information processing apparatus including:
the internal memory held within the IC chip and having an access control area for controlling the access to the internal memory;
an in-chip communication section held within the IC chip to receive the control information transmitted from the reader/writer;
an internal memory managing section for storing the received control information in the internal memory;
a control information obtaining section for obtaining the control information from the internal memory; and
an access control managing section for setting the access to the internal memory after receiving the control information from the control information obtaining section.

2. A reader/writer performing a non-contact communication with an IC chip of an information processing apparatus, comprising:
a processing section for executing service processing performed between the reader/writer and the information processing apparatus;
a processing completion determining section for determining whether or not a process of the service processing has been completed;
a control information generating section for generating control information for causing the information processing apparatus to store the control information in an internal memory of the information processing apparatus, the control information setting an access to an internal memory held within the IC chip, the control information being generated depending on a determination result indicating that the process of the service processing is completed; and
a control information transmitting section for transmitting the generated control information to the information processing apparatus.

3. An information processing apparatus being equipped with an IC chip that is capable of non-contact communication with a reader/writer, comprising:
- an internal memory held within the IC chip and having an access control area for controlling an access to the internal memory;
- an in-chip communication section held within the IC chip to receive control information transmitted from the reader/writer, the control information being generated by the reader/writer depending on whether a process of service processing between the IC chip and the reader/writer is completed for causing the information processing apparatus to store the control information in the internal memory and setting access control in the internal memory;
- an internal memory managing section for storing the received control information in the internal memory;
- a control information obtaining section for obtaining the control information from the internal memory; and
- an access control managing section for setting the access to the internal memory after receiving the control information from the control information obtaining section.

4. The information processing apparatus according to claim 3, further comprising:
- a control information reception notifying section for notifying that the control information transmitted from the reader/writer has been received,
- wherein the control information obtaining section obtains the control information from the internal memory, depending on the notification from the control information reception notifying section.

5. The information processing apparatus according to claim 3,
- wherein the information processing apparatus is a portable communication apparatus.

6. An access control managing method of a reader/writer performing a non-contact communication with an IC chip of an information processing apparatus, comprising the steps of:
- executing, by the reader/writer, service processing performed between the reader/writer and the information processing apparatus;
- determining, by the reader/writer, whether or not a process of the service processing has been completed;
- generating, by the reader/writer, control information for causing the information processing apparatus to store the control information in an internal memory of the information processing apparatus, the control information setting an access to the internal memory, the control information being generated depending on the determination result indicating that the process of the service processing is completed; and
- transmitting, by the reader/writer, the control information generated in the generating step to the information processing apparatus.

7. An access control managing method of an information processing apparatus being equipped with an IC chip performing a non-contact communication with a reader/writer and having an internal memory having within the IC chip an access control area for which access control is set, comprising the steps of:
- receiving control information transmitted from the reader/writer, the control information being generated by the reader/writer depending on whether a process of service processing between the IC chip and the reader/writer is completed for causing the information processing apparatus to store the control information in the internal memory and setting an access to the internal memory;
- storing the control information received in the receiving step in the internal memory;
- detecting that the control information has been received in the receiving step;
- obtaining the control information from the internal memory when the control information is detected in the detecting step; and
- setting the access to the internal memory after the control information is obtained in the obtaining step.

8. A non-transitory computer-readable storage medium encoded with a computer program for use in a reader/writer performing a non-contact communication with an IC chip of an information processing apparatus, the program, when executed on a computer, causes the card reader/writer to:
- execute service processing performed between the reader/writer and the information processing apparatus;
- determine whether or not a process of the service processing has been completed;
- generate control information for causing the information processing apparatus to store the control information in an internal memory of the information processing apparatus, the control information setting an access to an internal memory, the control information being generated depending on the determination result indicating that the process of the service processing is completed; and
- transmit the control information generated in the generating step to the information processing apparatus.

9. A non-transitory computer-readable storage medium encoded with a computer program for use in an information processing apparatus being equipped with an IC chip performing a non-contact communication with a reader/writer and having an internal memory having within an access control area for which access control is set, the program, when executed on a computer, causes the computer to execute the steps of:
- receiving control information transmitted from the reader/writer, the control information being generated by the reader/writer depending on whether a process of service processing between the IC chip and the reader/writer is completed for causing the information processing apparatus to store the control information in the internal memory and setting an access to the internal memory;
- storing the control information received in the receiving step in the internal memory;
- detecting that the control information has been received in the receiving step;
- obtaining the control information from the internal memory when the control information is detected in the detecting step; and
- setting the access to the internal memory after the control information is obtained in the obtaining step.

* * * * *